Sheet 1 2 Sheets.

C. H. McCormick.

Mower.

Reissued May 24, 1853
Reissued Dec. 21, 1858
Reissued Sep. 20, 1859.

No. 824

Inventor.
Cyrus H. McCormick

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858; Reissue No. 824, dated September 20, 1859.

DIVISION I.

*To all whom it may concern:*

Be it known that I, CYRUS H. MCCORMICK, of Chicago, in the county of Cook and State of Illinois, have invented a new and useful Improvement in Reaping-Machines, of which the following is a full, clear, and exact description, reference being had to the accompanying drawings, making part of this specification, in which—

Figure 1:
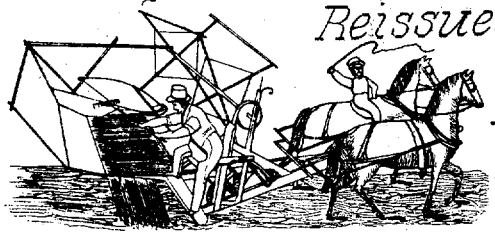
Figure 2:
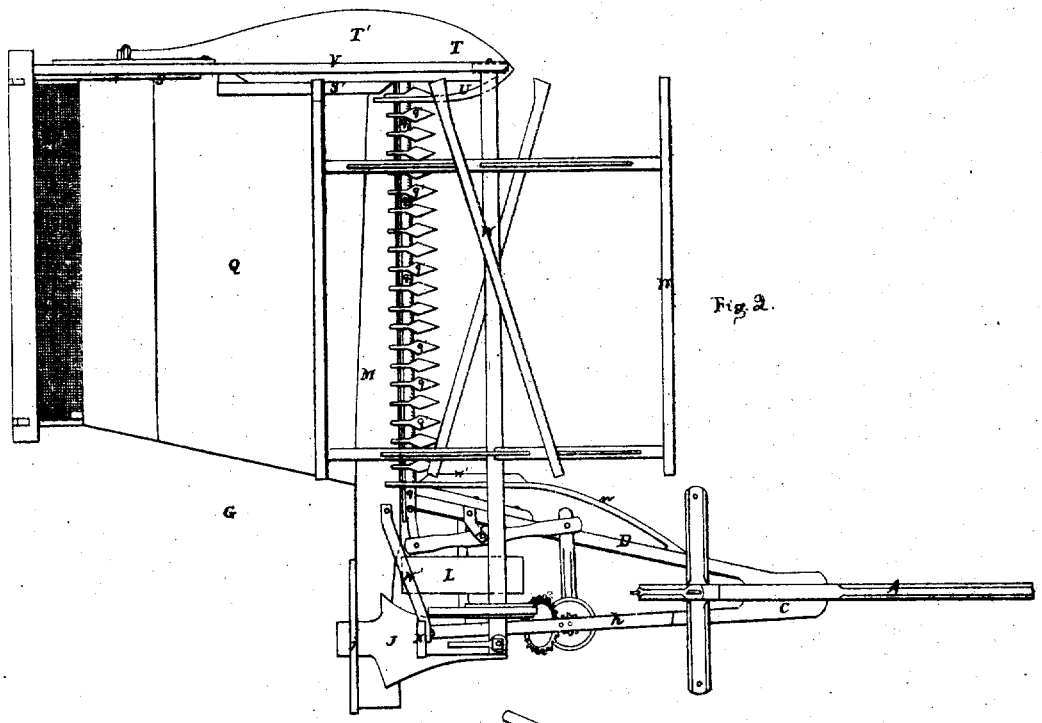
Figure 3:
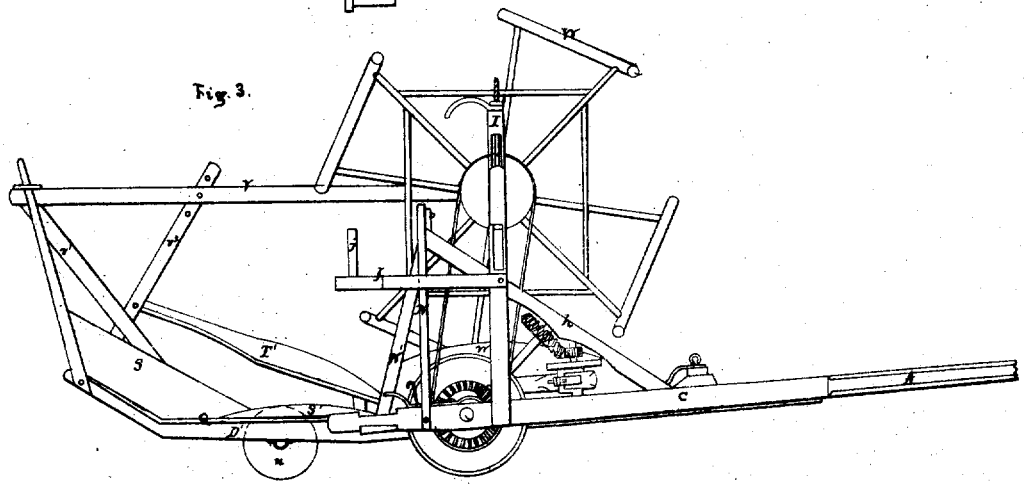

Figure 1 represents in perspective a side-draft-reel reaping-machine embracing my said improvement. Fig. 2 represents a plan of such a machine, as seen from above. Fig. 3 represents an elevation of the inner side of the machine. Fig. 4 represents an elevation of the outer side of the machine. Fig. 5 represents an elevation of the front of the machine, and Fig. 6 represents a view of the under side of the machine.

That side of the machine to which the horses are attached, and which runs next the stubble, I call the "inner" side, and the opposite side of the machine, which runs next the uncut grain, I call the "outer" side of the machine.

In constructing a low flat frame for a side-draft and side-gearing reel reaping-machine it is difficult to combine the qualities of strength, lightness, a proper balance, a convenient arrangement of the gearing for working the cutter and the reel, and a side discharge of the grain. These several conditions I have secured in a low and nearly flat frame of peculiar construction, the main beams of which are so disposed as to resemble the letter X, and are arranged with respect to their points of support and the parts connected to and carried by them so as to secure great strength and a convenient arrangement of the several parts in relation to each other and to the functions which they are respectively required to perform.

In the drawings I have shown this improvement applied to a McCormick reaping-machine, but deem it unnecessary to describe in detail any more of that machine than is needful to a proper understanding of this improvement.

The frame of the machine consists of two principal beams and subordinate pieces or parts. One of these principal beams, M, is the finger-piece or finger-beam, and is arranged transversely to the line of progress of the machine to carry the cutting apparatus. The other principal beam, D D′, runs lengthwise of the machine, and crosswise to the finger-beam, and extends both in front and in rear of it. The beam D D′ is subjected to the greatest transverse strain in a vertical direction, and the greatest transverse strain of the beam M is horizontal, and the greatest breadth of each of these beams is in the direction of its greatest strain. The beam D D′, at its front end, is attached to the rear end of the tongue A, by which the horses draw the machine, and it rests near its middle, at the point *d*, on the axle of the driving-wheel, which is also a fulcrum upon which this beam, acting as a lever, sustains the inner end of the finger-beam M and the inner side of the platform Q, both of which rest upon it. The beam D D′, for convenience of construction, and likewise to give it the greatest strength in the middle, where it rests upon its fulcrum, is made of two pieces, that overlap each other a considerable distance at the middle, where they are united or spliced together without either being reduced in size. A small transverse beam, $D^2$, Fig. 6, extends in rear of the outer end of the finger-beam M, and rests upon the axle of the grain-wheel *u*, which supports the outer side of the machine. A short beam, C, extends from the front side of the inner end of the finger-beam toward the rear end of the tongue A, to which it, as well as the principal beam D D′, is connected. The gearing is supported by the two beams C and D, whose arrangement in front of the finger-beam resembles that of the hounds of a wagon, and they both rest upon the axle of the driving-wheel, one on the inner and the other upon the outer end thereof. The platform occupies the space between the outer side of the rear portion, D, of the principal longitudinal beam and the outer portion of the finger-beam, and at its inner side does not extend behind the gearing, while the beam D′, which supports this side of the platform, does not interfere with the gaveling-space G on its inner side or the cutting apparatus on its outer side.

What I claim under this patent as my invention is—

A reaping-machine frame consisting mainly of two principal beams, D D′ and M, crossing each other, and arranged relatively to the supporting-wheels, so as to give firm support to a platform not extending behind the gearing, and without interfering with the cutter on one side or the gaveling-space on the other, substantially as described.

In testimony whereof I have hereunto signed my name.

C. H. McCORMICK.

In presence of—

P. H. WATSON,

JOHN S. HOLLINGSHEAD.